H. E. FULLER.
STEAM-COOKER.
No. 179,292. Patented June 27, 1876.
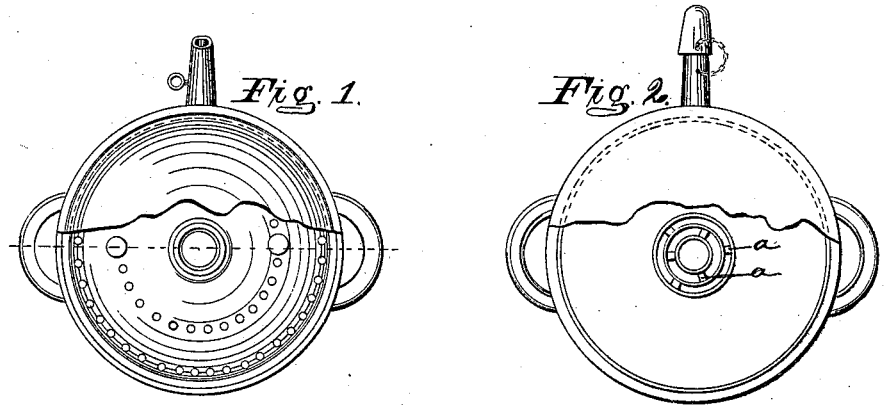
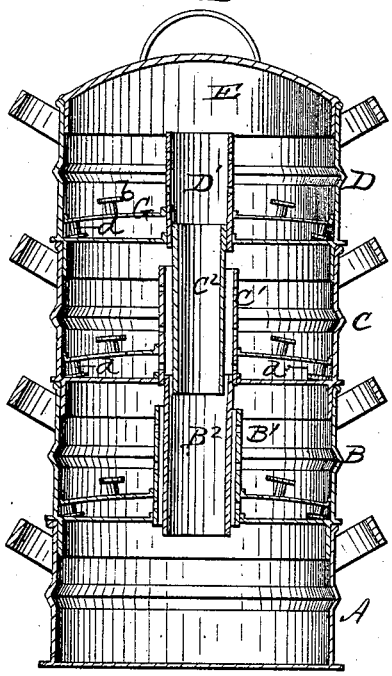
WITNESSES
INVENTOR

UNITED STATES PATENT OFFICE.

HIRAM E. FULLER, OF TAMA CITY, IOWA.

IMPROVEMENT IN STEAM-COOKERS.

Specification forming part of Letters Patent No. 179,292, dated June 27, 1876; application filed May 29, 1876.

*To all whom it may concern:*

Be it known that I, H. E. FULLER, of Tama City, in the county of Tama and in the State of Iowa, have invented certain new and useful Improvements in Steam-Cookers; and do hereby declare that the following is a full, clear, and exact description thereof, reference being had to the accompanying drawings, and to the letters of reference marked thereon, making a part of this specification.

The nature of my invention consists in the construction and arrangement of a steam-cooker, as will be hereinafter more fully set forth.

In order to enable others skilled in the art to which my invention appertains to make and use the same, I will now proceed to describe its construction and operation, referring to the annexed drawing, in which—

Figure 1 is a plan view of my cooker with a part of the lid broken off. Fig. 2 is a bottom view of the same with a part of the bottom broken off. Fig. 3 is a vertical section of the cooker.

A represents the bottom vessel or kettle in which the water is contained for generating steam. Above the same is a series of vessels, B C D, having suitable flanges under their bottoms, so as to fit within each other, as shown. The first one, B, of these vessels is provided with a central perforated pipe, $B^1$, extending upward nearly to the top thereof. Within this perforated pipe is a tube, $B^2$, extending above and below the same, and held apart from the walls thereof by small arms $a$ $a$, connecting the two together. The second vessel, C, is provided with similar tubes $C^1$ and $C^2$ of so much smaller diameter than the tubes $B^1$ $B^2$ that when the vessel C is placed upon the vessel B the upper end of the tube $B^2$ will fit closely on the inside of the perforated tube $C^1$ at the lower end, and the lower end of the tube $C^2$ will be within the upper end of the tube $B^2$ and sufficient space be left between them for the passage of steam. In like manner other vessels may be added until the last or top one, D, which has simply a central perforated tube, $D^1$, into the lower end of which the upper end of the tube $C^2$ fits closely. This top vessel is provided with a lid or cover, E.

As steam is generated in the bottom vessel or kettle A, the steam passes up between the two tubes $B^1$ and $B^2$, and through the perforations in the pipe $B^1$ into the vessel B for steaming the food placed therein. The steam in this vessel cannot ascend to the next one, as the entrance is closed by the pipe $B^2$. From the kettle A the steam also passes up through the tubes $B^2$ and $C^2$ into $D^1$, and through the perforations therein into the top vessel D. It also passes between the pipes $B^2$ and $C^2$ into $C^1$, and through the perforations therein into the vessel C.

The steam, it will be seen, in the various vessels is entirely confined, so that the odor from one vessel will not mingle with that of the others.

In each vessel is placed a perforated false bottom, G, made convex on its upper side, and provided with feet $d$ $d$, to hold it at a suitable distance from the bottom of the vessel, thus leaving room in which the condensed steam can collect and be away from the food cooking and keep the food dry. The perforated bottom G is, on its upper side, provided with knobs $b$ $b$, by means of which it is easily put in and taken out, as required.

Having thus fully described my invention, what I claim as new, and desire to secure by Letters Patent, is—

The combination of the vessel A, a series of vessels, B C D, having interior flanges, as shown, perforated pipe $B^1$, interior tube $B^2$, tubes $C^1$ $C^2$ of smaller diameter, central perforated tube $D^1$, and the convex perforated false bottom G, all constructed substantially as and for the purposes herein set forth.

In testimony that I claim the foregoing I have hereunto set my hand this 9th day of May, 1876.

HIRAM E. FULLER.

Witnesses:
R. B. RAINES,
G. H. GOODRICH.